US011242074B2

United States Patent
Zeng

(10) Patent No.: US 11,242,074 B2
(45) Date of Patent: Feb. 8, 2022

(54) OPENING AND CLOSING METHOD AND OPENING AND CLOSING MECHANISM OF CONVERTIBLE MOVABLE TOP COVER OF RAILWAY FREIGHT WAGON

(71) Applicant: ZHUZHOU HUASHENG INDUSTRIAL CO., LTD., Hunan (CN)

(72) Inventor: Shenghua Zeng, Hunan (CN)

(73) Assignee: ZHUZHOU HUASHENG INDUSTRIAL CO., LTD., Hunan (CN)

(*) Notice: Subject to any disclaimer, the term of this patent is extended or adjusted under 35 U.S.C. 154(b) by 277 days.

(21) Appl. No.: 16/629,311

(22) PCT Filed: Sep. 13, 2018

(86) PCT No.: PCT/CN2018/105352
§ 371 (c)(1),
(2) Date: Jan. 7, 2020

(87) PCT Pub. No.: WO2019/062551
PCT Pub. Date: Apr. 4, 2019

(65) Prior Publication Data
US 2020/0239042 A1    Jul. 30, 2020

(30) Foreign Application Priority Data

Sep. 27, 2017 (CN) .......................... 201710892741.9

(51) Int. Cl.
*B61D 39/00* (2006.01)
(52) U.S. Cl.
CPC .................................. *B61D 39/002* (2013.01)

(58) Field of Classification Search
CPC .. B61D 39/002; B61D 39/006; B61D 39/007; B61D 39/00; B61D 39/003; B61D 7/30; B61D 7/26
See application file for complete search history.

(56) References Cited

U.S. PATENT DOCUMENTS 1,213,327 A * 1/1917 Baker ...................... B61D 7/30
414/388
2,909,594 A * 10/1959 Schlesinger ........... H04N 9/643
348/641
(Continued)

FOREIGN PATENT DOCUMENTS

| CN | 2905547 | 5/2007 |
|---|---|---|
| CN | 102616508 | 8/2012 |

(Continued)

OTHER PUBLICATIONS

"International Search Report (Form PCT/ISA/210) of PCT/CN2018/105352", dated Nov. 29, 2018, with English translation thereof, pp. 1-6.

*Primary Examiner* — Mark T Le
(74) *Attorney, Agent, or Firm* — JCIP Global Inc.

(57) ABSTRACT

An opening and closing method and mechanism is adapted for a convertible movable top cover of a railway freight wagon including first and second convertible movable top covers; a belt driving mechanism is arranged on the wagon. One end of the first convertible movable top cover is connected with one side of a driving belt in the belt driving mechanism and a first outer convex portion; one end of the second convertible movable top cover is connected with the other side of the driving belt in the belt driving mechanism and a second outer convex portion. A moving direction of one side of the driving belt is opposite to that of the other side of the driving belt. First and second stopper devices are arranged on the ground. When the wagon moves, the first (Continued)

stopper device contacts the first outer convex portion or the second stopper device contacts the second outer convex portion.

13 Claims, 11 Drawing Sheets

(56) References Cited

U.S. PATENT DOCUMENTS

| | | | |
|---|---|---|---|
| 10,696,312 B1 * | 6/2020 | Knight | ................ B61D 39/007 |
| 2011/0297037 A1 | 12/2011 | Baranowski et al. | |
| 2012/0024190 A1 | 2/2012 | Baranowski et al. | |

FOREIGN PATENT DOCUMENTS

| | | | |
|---|---|---|---|
| CN | 203372247 | | 1/2014 |
| CN | 203592928 | | 5/2014 |
| CN | 105313760 | | 2/2016 |
| CN | 107628047 | | 1/2018 |
| CN | 207481910 | | 6/2018 |
| DE | 1 580 981 | * | 12/1970 |
| FR | 1 309 155 | * | 11/1962 |
| FR | 1 416 345 | * | 11/1965 |

* cited by examiner

OPENING AND CLOSING METHOD AND OPENING AND CLOSING MECHANISM OF CONVERTIBLE MOVABLE TOP COVER OF RAILWAY FREIGHT WAGON

CROSS-REFERENCE TO RELATED APPLICATION

This application is a 371 of international application of PCT application serial no. PCT/CN2018/105352, filed on Sep. 13, 2018, which claims the priority benefit of China application no. 201710892741.9, filed on Sep. 27, 2017. The entirety of each of the above mentioned patent applications is hereby incorporated by reference herein and made a part of this specification.

BACKGROUND

Technical Field

The present invention relates to an opening and closing method and an opening and closing mechanism of a movable top cover, in particular to an opening and closing method and an opening and closing mechanism of a convertible movable top cover of a railway freight wagon.

Description of Related Art

A railway freight wagon refers to a truck which has end walls, side walls and floor, has no roof and is open upwards. It is mainly used for transporting bulk cargoes such as coal, ore, mining material, timber and steel, and can also be used for transporting mechanical equipment with light weight. Therefore, the wagon has great universality, and occupies the largest quantity in the truck composition. At present, there are about 300,000 wagons in the whole railway, accounting for more than 50% of the total number of trucks.

To prevent coal and other articles in carriages from dropping along the railway and damaging the surrounding environment in the transportation process of the railway freight wagon, canvas or other awnings generally are required to cover the tops of the carriages. At present, the canvas is covered on or removed from the tops of the carriages manually, which consumes great labor intensity of workers and causes low working efficiency. To this end, some movable top covers which can be automatically opened are designed in the prior art. However, such movable top covers are opened and closed by a power mechanism arranged on the wagon or through manual operation, thereby increasing installation cost and installation difficulty of the movable top covers.

The Chinese utility model patent with the authorization announcement number of CN2905547Y and the authorization announcement date of May 30, 2007 discloses a novel coal transportation carriage, which is used with a freight car, provided with a movable top cover device on a carriage body, and comprises a top cover and an operation control system. The top cover is formed by connecting a plurality of sheets through pin shafts. One end is fixed on the front end or rear end of the carriage body, and a sliding block is installed on the bottom of the other end and can slide along guide rails on top surfaces of carriage boards on both sides of the carriage body. The top cover can be stretched and covered on the top surface of the carriage body, and can also be folded and contracted to be furled to the end surface of the carriage body. The operation control system is composed of a control handle and a traction mechanism, and arranged on the outer side surface of the carriage body. The traction mechanism is connected with the sliding block on the bottom surface of the top cover, and is operated by the control handle to pull the top cover to move forwards and backwards.

The Chinese utility model patent with the authorization announcement number of CN203372247U and the authorization announcement date of Jan. 1, 2014 discloses a railway wagon with a movable roof device, comprising a wagon body with an opening. The wagon body is encircled by front and rear end walls and side walls on both sides. A movable roof device is covered on the top of the wagon body, and a roof storage guardrail is arranged at the rear end wall. The movable roof device comprises a tarpaulin and a transmission device that drives the tarpaulin to cover the opening or fold to the roof storage guardrail.

In the above patent literature, the movable top covers are opened and closed by a built-in power mechanism or manually, thereby increasing the installation cost and the installation difficulty of the movable top covers.

To sum up, an urgent technical problem to be solved is how to design an opening and closing method and an opening and closing mechanism of a convertible movable top cover of a railway freight wagon to automatically open or close the movable top cover without adding the power mechanism or completing through manual operation to reduce the installation difficulty of the movable top cover and reduce the installation cost of the movable top cover.

SUMMARY

The technical problem to be solved by the present invention is to provide an opening and closing method and an opening and closing mechanism of a convertible movable top cover of a railway freight wagon with respect to the defects in the prior art. The movable top cover can be automatically opened or closed without adding a power mechanism or manual operation, thereby reducing the installation difficulty of the movable top cover and reducing the installation cost of the movable top cover.

To solve the above technical problems, the present invention adopts the following technical solution. An opening and closing method of a convertible movable top cover of a railway freight wagon is provided. The convertible movable top cover is configured as a two-half structure comprising a first convertible movable top cover and a second convertible movable top cover; and the first convertible movable top cover and the second convertible movable top cover can be respectively furled and opened from a middle part of the wagon to both ends of the wagon. A belt driving mechanism is also arranged on the wagon. One end of the first convertible movable top cover is connected with one side of a driving belt in the belt driving mechanism, and a first outer convex portion is arranged at one end of the first convertible movable top cover; the other end of the first convertible movable top cover is fixed on the wagon; one end of the second convertible movable top cover is connected with the other side of the driving belt in the belt driving mechanism, and a second outer convex portion is arranged at one end of the second convertible movable top cover; the other end of the second convertible movable top cover is fixed on the wagon; the moving direction of one side of the driving belt is opposite to the moving direction of the other side of the driving belt; and a first stopper device and a second stopper device are arranged on the ground. When the wagon moves, the first stopper device comes into contact with the first outer convex portion to drive the belt driving mechanism to rotate in one direction, so that the first convertible movable top cover and the second convertible movable top cover are respectively furled and opened from the middle part of the wagon to both ends of the wagon; when the wagon continues to move in the same direction, the second stopper device comes into contact with the second outer convex portion to drive the belt driving mechanism to rotate in another opposite direction, so that the first convertible movable top cover and the second convertible movable top cover are extended and closed from both ends of the wagon to the middle part of the wagon.

Preferably, the belt driving mechanism further comprises a first rotating wheel and a second rotating wheel which are rotatably connected to both sides of the wagon through a first rotating shaft, and a third rotating wheel and a fourth rotating wheel which are rotatably connected to both sides of the wagon through a second rotating shaft; the driving belt comprises a first driving belt and a second driving belt; the first rotating wheel and the third rotating wheel are in matched transmission connection by the first driving belt; the second rotating wheel and the fourth rotating wheel are in matched transmission connection by the second driving belt; one end of the first convertible movable top cover is connected with one side of the first driving belt; the first outer convex portion is arranged on one end of the first convertible movable top cover adjacent to the first driving belt; the other end of the first convertible movable top cover is fixedly connected to the wagon; one end of the second convertible movable top cover is connected with one side of the second driving belt; the second outer convex portion is arranged on one end of the second convertible movable top cover adjacent to the second driving belt; the moving direction of one side of the first driving belt is opposite to the moving direction of one side of the second driving belt; the other end of the second convertible movable top cover is also fixedly connected to the wagon; the first stopper device and the second stopper device are respectively arranged on the ground on both sides of the wagon.

Preferably, the first stopper device and the second stopper device comprise ground rods arranged on the ground and stoppers hinged on the ground rods at one end; and a reset tension spring is further arranged between the stopper and the ground rod.

When the folding movable top cover is opened, the wagon is controlled to move and the other end of the stopper in the first stopper device is in contact with the first outer convex portion, thereby driving the belt driving mechanism to rotate in one direction to open the convertible movable first top cover and the second convertible movable top cover. Meanwhile, the reset tension spring of the first stopper device is stretched. When the first convertible movable top cover and the second convertible movable top cover are opened in place, the wagon is controlled to continue to move. At this moment, under the driving of the wagon, the first outer convex portion is separated from the other end of the stopper in the first stopper device; and under the reset action of the reset tension spring of the first stopper device, the stopper of the first stopper device returns to an original position.

When the convertible movable top cover is closed, the wagon is controlled to continue to move in the same direction and the other end of the stopper in the second stopper device is in contact with the second outer convex portion, thereby driving the belt driving mechanism to rotate in another opposite direction to close the first convertible movable top cover and the second convertible movable top cover. Meanwhile, the reset tension spring of the second stopper device is stretched. When the first convertible movable top cover and the second convertible movable top cover are closed in place, the wagon is controlled to continue to move. At this moment, under the driving of the wagon, the second outer convex portion is separated from the other end of the stopper in the second stopper device; and under the reset action of the reset tension spring of the second stopper device, the stopper of the second stopper device returns to an original position.

Preferably, the first stopper device and the second stopper device comprise ground rods arranged on the ground and telescopic cylinders arranged on the ground rods.

When the convertible movable top cover is opened, a piston rod of the telescopic cylinder in the first stopper device is controlled to extend and then the wagon is controlled to move, and the piston rod of the telescopic cylinder in the first stopper device is in contact with the first outer convex portion, thereby driving the belt driving mechanism to rotate in one direction to open the first convertible movable top cover and the second convertible movable top cover. When the first convertible movable top cover and the second convertible movable top cover are opened in place, the piston rod of the telescopic cylinder in the first stopper device is controlled to retract.

When the convertible movable top cover is closed, a piston rod of the telescopic cylinder in the second stopper device is controlled to extend and then the wagon is controlled to continue to move in the same direction, and the piston rod of the telescopic cylinder in the second stopper device is in contact with the second outer convex portion, thereby driving the belt driving mechanism to rotate in another opposite direction to close the first convertible movable top cover and the second convertible movable top cover. When the first convertible movable top cover and the second convertible movable top cover are closed in place, the piston rod of the telescopic cylinder in the second stopper device is controlled to retract.

Preferably, the belt driving mechanism further comprises a first rotating wheel rotatably connected to the middle part of the wagon through a first rotating shaft, and a second rotating wheel rotatably connected to the middle part of the wagon through a second rotating shaft; the first rotating wheel and the second rotating wheel are in matched transmission connection by the first driving belt; the second rotating wheel and the rotating wheel are in matched transmission connection by the first driving belt; one end of the first convertible movable top cover is connected with one side of the driving belt; the other end of the first convertible movable top cover is fixedly connected to the wagon; one end of the second convertible movable top cover is connected with the other side of the driving belt; the moving direction of one side of the driving belt is opposite to the moving direction of the other side of the driving belt; the other end of the second convertible movable top cover is also fixedly connected to the wagon. The first stopper device and the second stopper device are respectively arranged on the ground through a first gantry and a second gantry, and the first stopper device and the second stopper device are located at the middle positions of the wagon; the first outer convex portion and the second outer convex portion are also respectively arranged at the middle position of the end portion of the first convertible movable top cover and at the middle position of the end portion of the second convertible movable top cover.

When the folding movable top cover is opened, the wagon is controlled to move so that the first stopper device comes into contact with the first outer convex portion, thereby driving the belt driving mechanism to rotate in one direction to open the first convertible movable top cover and the second convertible movable top cover.

When the convertible movable top cover is closed, the wagon is controlled to continue to move in the same direction, and the second stopper device comes into contact with the second outer convex portion, thereby driving the belt driving mechanism to rotate in another opposite direction to close the first convertible movable top cover and the second convertible movable top cover.

Preferably, the belt driving mechanism further comprises a first rotating wheel and a second rotating wheel which are rotatably connected to both sides of the wagon through a first rotating shaft, and a third rotating wheel and a fourth rotating wheel which are rotatably connected to both sides of the wagon through a second rotating shaft; the driving belt comprises a first driving belt and a second driving belt; the first rotating wheel and the third rotating wheel are in matched transmission connection by the first driving belt; the second rotating wheel and the fourth rotating wheel are in matched transmission connection by the second driving belt; one end of the first convertible movable top cover is connected with one side of the driving belt; the first outer convex portion is arranged on one end of the first convertible movable top cover located in the middle part of the wagon; the other end of the first convertible movable top cover is fixedly connected to the wagon; one end of the second convertible movable top cover is connected with one side of the second driving belt; the second outer convex portion is arranged on one end of the second convertible movable top cover located in the middle part of the wagon; the moving direction of one side of the first driving belt is opposite to the moving direction of one side of the second driving belt; the other end of the second convertible movable top cover is also fixedly connected to the wagon; the first stopper device and the second stopper device are respectively arranged on the ground on both sides of the wagon; during the motion of the wagon, the first stopper device can come into contact with the first outer convex portion located in the middle part of the wagon, and the second stopper device can come into contact with the second outer convex portion at the middle part of the wagon.

The present invention also discloses an opening and closing mechanism of a convertible movable top cover of a railway freight wagon. The convertible movable top cover is arranged on the wagon. The convertible movable top cover comprises a first convertible movable top cover and a second convertible movable top cover; and the first convertible movable top cover and the second convertible movable top cover can be respectively furled and opened from the middle part of the wagon to both ends of the wagon. The opening and closing mechanism also comprises a belt driving mechanism. The belt driving mechanism comprises a first rotating wheel and a second rotating wheel which are rotatably connected to both sides of the wagon through a first rotating shaft, a third rotating wheel and a fourth rotating wheel which are rotatably connected to both sides of the wagon through a second rotating shaft, and a driving belt; the driving belt comprises a first driving belt and a driving belt; the first rotating wheel and the third rotating wheel are in matched transmission connection by the first driving belt; the second rotating wheel and the fourth rotating wheel are in matched transmission connection by the second driving belt; one end of the first convertible movable top cover is connected with one side of the first driving belt; the first outer convex portion is arranged on one end of the first convertible movable top cover; the other end of the first convertible movable top cover is fixedly connected to the wagon; one end of the second convertible movable top cover is connected with one side of the driving belt; the second outer convex portion is arranged on one end of the second convertible movable top cover; the moving direction of one side of the first driving belt is opposite to the moving direction of one side of the second driving belt; the other end of the second convertible movable top cover is also fixedly connected to the wagon; and a first stopper device and a second stopper device are respectively arranged on the ground on both sides of the wagon. When the wagon moves, the first stopper device comes into contact with the first outer convex portion to drive the belt driving mechanism to rotate in one direction, so that the first convertible movable top cover and the second convertible movable top cover are respectively furled and opened from the middle part of the wagon to both ends of the wagon; when the wagon continues to move in the same direction, the second stopper device comes into contact with the second outer convex portion to drive the belt driving mechanism to rotate in another opposite direction, so that the first convertible movable top cover and the second convertible movable top cover are extended and closed from both ends of the wagon to the middle part of the wagon.

Preferably, the first convertible movable top cover and the second convertible movable top cover comprise a plurality of plate bodies, and the plurality of plate bodies are sequentially connected end to end to form a folding cover plate by a plurality of hinge connecting pieces. After the cover plate is folded, first cover plate supporting roller mechanisms and second cover plate supporting roller mechanisms are respectively arranged on both ends of a central shaft of the plurality of hinge connecting pieces located at a lower position and on both sides of one end of the first plate body in the plurality of plate bodies.

A first track and a second track are arranged on both sides of a top opening of the wagon. The plurality of first cover plate supporting roller mechanisms are in rolling contact with the first track, and the plurality of second cover plate supporting roller mechanisms are in rolling contact with the second track, so that the first convertible movable top cover and the second convertible movable top cover can be moved along the first track and the second track and opened or closed and furled.

Preferably, the first stopper device and the second stopper device comprise ground rods arranged on the ground and stoppers hinged on the ground rods at one end; and a reset tension spring is further arranged between the stopper and the ground rod. When the wagon moves, the other end of the stopper in the first stopper device is in contact with the first outer convex portion, thereby driving the belt driving mechanism to rotate in one direction to open the first convertible movable top cover and the second convertible movable top cover. When the wagon continues to move, the other end of the stopper in the second stopper device is in contact with the second outer convex portion, thereby driving the belt driving mechanism to rotate in another opposite direction to close the first convertible movable top cover and the second convertible movable top cover.

Preferably, a first guide rail is arranged on a side portion of the first track; a second guide rail is arranged on a side portion of the second track; a first sliding block and a second sliding block are respectively arranged in the first guide rail and the second guide rail; and the first sliding block and the second sliding block can respectively move back and forth along the first guide rail and the second guide rail. The side portion of the first sliding block is connected with the first cover plate supporting roller mechanism on one end of the first plate body of the first convertible movable top cover by a first connecting rod; and one side of the first driving belt is also connected to the first connecting rod. One end of the last plate body of the first convertible movable top cover is fixedly connected to the wagon. The second outer convex portion is arranged on the side portion of the second sliding block. The second outer convex portion is connected with the second cover plate supporting roller mechanism on one end of the first plate body of the second convertible movable top cover by a second connecting rod; and one side of the second driving belt is also connected to the second connecting rod through the connecting piece. One end of the last plate body of the second convertible movable top cover is fixedly connected to the wagon.

Preferably, the first stopper device and the second stopper device comprise ground rods arranged on the ground and telescopic cylinders arranged on the ground rods. When the wagon moves, a piston rod of the telescopic cylinder in the first stopper device is controlled to extend to come into contact with the first outer convex portion, thereby driving the belt driving mechanism to rotate in one direction to open the first convertible movable top cover and the second convertible movable top cover. When the wagon continues to move, the telescopic cylinder in the second stopper device extends to come into contact with the second outer convex portion, thereby driving the belt driving mechanism to rotate in another opposite direction to close the first convertible movable top cover and the second convertible movable top cover.

Preferably, the first cover plate supporting roller mechanism and the second cover plate supporting roller mechanism comprise mechanism brackets, top supporting wheels rotatably connected to the mechanism brackets, first anti-drop guide blocks arranged on one side portion of the mechanism brackets, and second anti-drop guide blocks arranged on the other side portion of the mechanism brackets. The first anti-drop guide blocks and the second anti-drop guide blocks are in L shape.

The first track and the second track are in I shape. The top supporting wheel of the first cover plate supporting roller mechanism is in rolling contact on the top of the first I-shaped track, and the top supporting wheel of the second cover plate supporting roller mechanism is in rolling contact on the top of the second I-shaped track. The first L-shaped anti-drop guide block and the second L-shaped anti-drop guide block in the first cover plate supporting roller mechanism are respectively located in positions of both sides of the top of the first I-shaped track, and the first L-shaped anti-drop guide block and the second L-shaped anti-drop guide block in the second cover plate supporting roller mechanism are respectively located in positions of both sides of the top of the second I-shaped track.

Preferably, the first stopper device and the second stopper device comprise device brackets, blocking arms hinged on the device brackets at one end, and fixed pulley blocks arranged on the device brackets. The fixed pulley blocks comprise a plurality of fixed pulleys arranged on the device brackets and pull ropes matched with the plurality of fixed pulleys. One end of the pull ropes is connected with the other end of the blocking arms, and weight blocks are fixedly connected with the other end of the pull ropes.

The present invention has the beneficial effects: the present invention uses the characteristic that the moving directions of both sides of the driving belt bypassing the driving wheel in the belt drive mechanism are opposite, and enables the stopper devices arranged on the ground to be matched with the outer convex portions on the end portions of the folding movable end cover with the two-half structure, so that the first convertible movable top cover and the second convertible movable top cover can be automatically opened or closed together without adding a power mechanism or manual operation, thereby reducing the installation difficulty of the movable top cover and reducing the installation cost of the movable top cover. Through different structural design of the first stopper device and the second stopper device arranged on the ground, it is more convenient to control the opening and closing of the folding movable top cover on the wagon. Through the matching of the guide rails and the sliding blocks, the smoothness of the folding movable top cover during motion can be further ensured. The first track and the second track are arranged in an inverted U shape. In this way, the first convertible movable top cover and the second convertible movable top cover can be furled and then respectively furled to both side portions of the wagon, thereby reducing the space occupied by the top of the wagon.

DESCRIPTION OF THE EMBODIMENTS

A technical solution of the present invention is further described in detail below in combination with the drawings and the specific embodiments.

Figure 1:
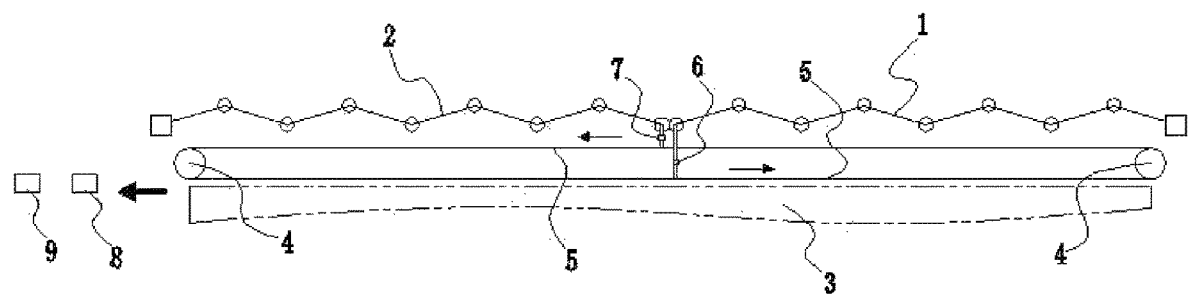
FIG. 1 is a schematic diagram of an opening and closing method of a folding movable top cover of a railway freight wagon in the present invention.

As shown in FIG. 1, an opening and closing method of a convertible movable top cover of a railway freight wagon is provided. The convertible movable top cover is configured as a two-half structure comprising a first convertible movable top cover 1 and a second convertible movable top cover 2; and the first convertible movable top cover 1 and the second convertible movable top cover 2 can be respectively furled and opened from the middle part of the wagon 3 to both ends of the wagon 3. A belt driving mechanism 4 is also arranged on the wagon 3. One end of the first convertible movable top cover 1 is connected with one side of a driving belt 5 in the belt driving mechanism, and an first outer convex portion 6 is arranged at one end of the first convertible movable top cover 1; the other end of the first convertible movable top cover 1 is fixed on the wagon 3; one end of the second convertible movable top cover 2 is connected with the other side of the driving belt 5 in the belt driving mechanism, and a second outer convex portion 7 is arranged at one end of the second convertible movable top cover 2; the other end of the second convertible movable top cover 2 is fixed on the wagon 3; the moving direction of one side of the driving belt 4 is opposite to the moving direction of the other side of the driving belt 4, i.e., one side of the driving belt and the other side of the driving belt are both sides of the driving belt bypassing a driving wheel; and a stopper device 18 and a second stopper device 9 are arranged on the ground. When the wagon 3 moves, the first stopper device 8 comes into contact with the first outer convex portion 6 to drive the belt driving mechanism 4 to rotate in one direction, so that the first convertible g movable top cover 1 and the second convertible movable top cover 2 are respectively furled and opened from the middle part of the wagon 3 to both ends of the wagon 3; when the wagon 3 continues to move in the same direction, the second stopper device 9 comes into contact with the second outer convex portion 7 to drive the belt driving mechanism 4 to rotate in another opposite direction, so that the first convertible movable top cover 1 and the second convertible movable top cover 2 are extended and closed from both ends of the wagon 3 to the middle part of the wagon 3. The present invention can set a cargo loading region along the railway, and install the first stopper device and the second stopper device along the railway of the cargo loading region to complete the loading of cargoes. The present invention uses the characteristic that the moving directions of both sides of the driving belt bypassing the driving wheel in the belt drive mechanism are opposite, and enables the stopper devices arranged on the ground to be matched with the outer convex portions on the end portions of the convertible movable end cover with the two-half structure, so that the first convertible movable top cover and the second convertible movable top cover can be automatically opened or closed together without adding a power mechanism or manual operation, thereby reducing the installation difficulty of the movable top cover and reducing the installation cost of the movable top cover.

Figure 2:
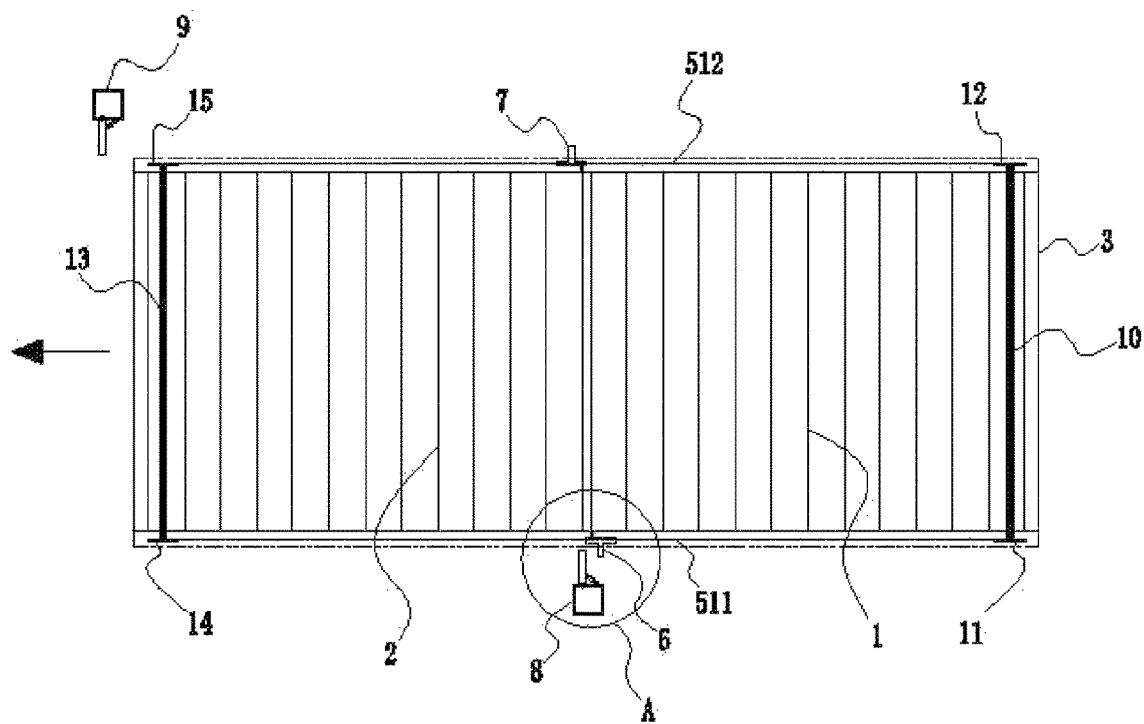
FIG. 2 is a top structural schematic diagram of an opening and closing mechanism when a folding movable top cover is closed in embodiment 1 of the present invention.
Figure 3:
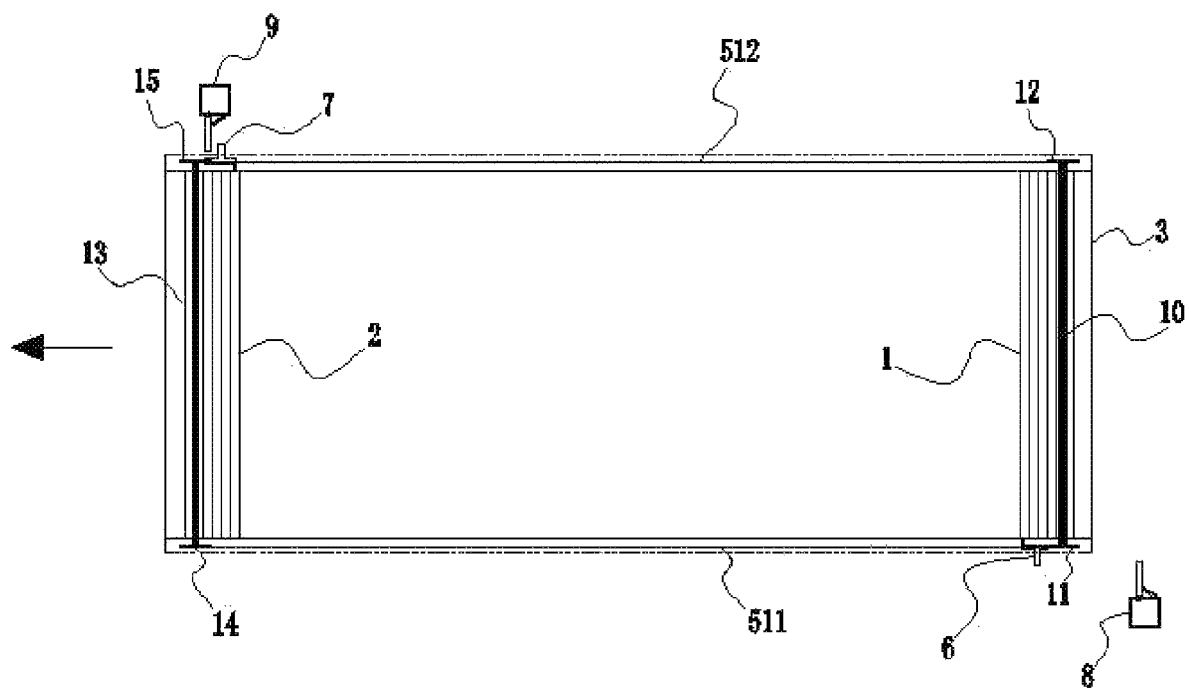
FIG. 3 is a top structural schematic diagram of an opening and closing mechanism when a folding movable top cover is opened in embodiment 1 of the present invention.

Embodiment 1: as shown in FIG. 2 and FIG. 3, the belt driving mechanism comprises a first rotating wheel 11 and a second rotating wheel 12 which are rotatably connected to both sides of the wagon 3 through a first rotating shaft 10, and a third rotating wheel 14 and a fourth rotating wheel 15 which are rotatably connected to both sides of the wagon 3 through a second rotating shaft 13; the driving belt 5 comprises a first driving belt 511 and a second driving belt 512; the first rotating wheel 11 and the third rotating wheel 14 are in matched transmission connection by the first driving belt 511; the second rotating wheel 12 and the fourth rotating wheel 15 are in matched transmission connection by the second driving belt 512; one end of the first convertible movable top cover 1 is connected with one side of the first driving belt 511; the first outer convex portion 6 is arranged on one end of the first convertible movable top cover 1 adjacent to the first driving belt 511; the other end of the first convertible movable top cover 1 is fixedly connected to the wagon 3; one end of the second convertible movable top cover 2 is connected with one side of the second driving belt 512; the second outer convex portion 7 is arranged on one end of the second convertible movable top cover 2 adjacent to the second driving belt 512; the moving direction of one side of the first driving belt 511 is opposite to the moving direction of one side of the second driving belt 512; the other end of the second convertible movable top cover 2 is also fixedly connected to the wagon 3; the first stopper device 8 and the second stopper device 9 are respectively arranged on the ground on both sides of the wagon 3. In the present embodiment, one end of the first convertible movable top cover 1 is connected with a driving belt body at a lower side of the first driving belt 511; and one end of the second convertible movable top cover 2 is connected with a driving belt body at an upper side of the second driving belt 512. In this way, when the belt driving mechanism rotates, the moving direction of the lower side of the first driving belt is opposite to the moving direction of the upper side of the second driving belt, so that one end of the first convertible movable top cover and one end of the second convertible movable top cover respectively move in opposite directions. In the present embodiment, during the motion of the wagon to the left (in the direction of the arrow in the figure), when the outer convex portion 6 is blocked by the stopper device 18, the belt driving mechanism rotates, and one end of the first convertible movable top cover 1 moves to the right and is opened. Due to the action of the belt driving mechanism, one end of the second convertible movable top cover 2 necessarily moves to the left and is opened, so that the second convertible movable top cover 1 and the second convertible movable top cover 2 can be automatically opened, and then the cargoes are loaded. After the cargoes are loaded, the wagon 3 is controlled to continue to move forwardly and to the left (in the direction of the arrow in the figure), When the second outer convex portion 7 is blocked by the second stopper device 9, the belt driving mechanism rotates in the opposite direction, and one end of the second convertible movable top cover 2 inevitably moves to the right and is closed. Due to the action of the belt driving mechanism, one end of the first convertible movable top cover 1 necessarily moves to the left and is closed, so that the first convertible movable top cover 1 and the second convertible movable top cover 2 can be automatically closed. The belt driving mechanism can be composed of a sprocket and a chain under cooperation.

Figure 4:
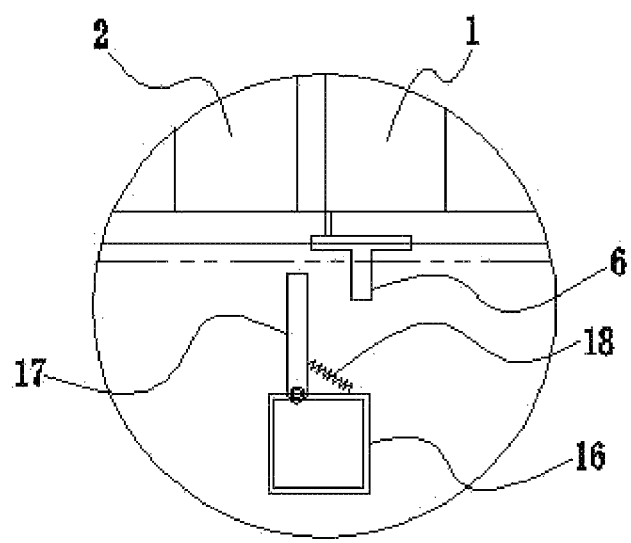
FIG. 4 is an amplified structural schematic diagram of portion A in FIG. 2.

As shown in FIG. 2 to FIG. 4, the first stopper device 8 and the second stopper device 9 comprise ground rods 16 arranged on the ground and stoppers 17 hinged on the ground rods 16 at one end; and a reset tension spring 18 is further arranged between the stopper 17 and the ground rod 16.

When the folding movable top cover is opened, the wagon 3 is controlled to move and the other end of the stopper 17 in the first stopper device 8 is in contact with the first outer convex portion 6, thereby driving the belt driving mechanism to rotate in one direction to open the first convertible movable top cover 1 and the second convertible movable top cover 2. Meanwhile, the reset tension spring 18 of the first stopper device 8 is stretched. When the first convertible movable top cover 1 and the second convertible movable top cover 2 are opened in place, the wagon 3 is controlled to continue to move. At this moment, under the driving of the wagon 3, the first outer convex portion 6 is separated from the other end of the stopper 17 in the first stopper device 8; and under the reset action of the reset tension spring 18 of the first stopper device 8, the stopper 17 of the first stopper device 8 returns to an original position.

When the folding movable top cover is closed, the wagon 3 is controlled to continue to move in the same direction and the other end of the stopper 17 in the second stopper device 9 is in contact with the second outer convex portion 7, thereby driving the belt driving mechanism to rotate in another opposite direction to close the first convertible movable top cover 1 and the second convertible movable top cover 2. Meanwhile, the reset tension spring 18 of the second stopper device 9 is stretched. When the first convertible movable top cover 1 and the second convertible movable top cover 2 are closed in place, the wagon 3 is controlled to continue to move. At this moment, under the driving of the wagon 3, the second outer convex portion 7 is separated from the other end of the stopper 17 in the second stopper device 9; and under the reset action of the reset tension spring 18 of the second stopper device 9, the stopper 17 of the second stopper device 9 returns to an original position.

As shown in FIG. 2 to FIG. 4, the present embodiment also discloses an opening and closing mechanism of a folding movable top cover of a railway freight wagon, comprising a folding movable top cover arranged on the wagon 3. The folding movable top cover comprises a first convertible movable top cover 1 and a second convertible movable top cover 2; and the first convertible movable top cover 1 and the second convertible movable top cover 2 can be respectively furled and opened from the middle part of the wagon 3 to both ends of the wagon 3. The opening and closing mechanism also comprises a belt driving mechanism. The belt driving mechanism comprises a first rotating wheel 11 and a second rotating wheel 12 which are rotatably connected to both sides of the wagon 3 through a first rotating shaft 10, a third rotating wheel 14 and a fourth rotating wheel 15 which are rotatably connected to both sides of the wagon through a second rotating shaft 13, and a driving belt 5; the driving belt 5 comprises a first driving belt 511 and a second driving belt 512; the first rotating wheel 11 and the third rotating wheel 14 are in matched transmission connection by the first driving belt 511; the second rotating wheel 12 and the fourth rotating wheel 15 are in matched transmission connection by the second driving belt 512; one end of the first convertible movable top cover 1 is connected with one side of the first driving belt 511; the first outer convex portion 6 is arranged on one end of the first convertible movable top cover 1; the other end of the first convertible movable top cover 1 is fixedly connected to the wagon 3; one end of the second convertible movable top cover 2 is connected with one side of the second driving belt 512; the second outer convex portion 7 is arranged on one end of the second convertible movable top cover 2; the moving direction of one side of the first driving belt 511 is opposite to the moving direction of one side of the second driving belt 512; the other end of the second convertible movable top cover 2 is also fixedly connected to the wagon 3; and a first stopper device 8 and a second stopper device 9 are respectively arranged on the ground on both sides of the wagon. When the wagon moves, the first stopper device 8 comes into contact with the first outer convex portion 6 to drive the belt driving mechanism to rotate in one direction, so that the first convertible movable top cover 1 and the second convertible movable top cover 2 are respectively furled and opened from the middle part of the wagon 3 to both ends of the wagon 3; when the wagon 3 continues to move in the same direction, the second stopper device 9 comes into contact with the second outer convex portion 7 to drive the belt driving mechanism to rotate in another opposite direction, so that the first convertible movable top cover 1 and the second convertible movable top cover 2 are extended and closed from both ends of the wagon to the middle part of the wagon.

Figure 5:
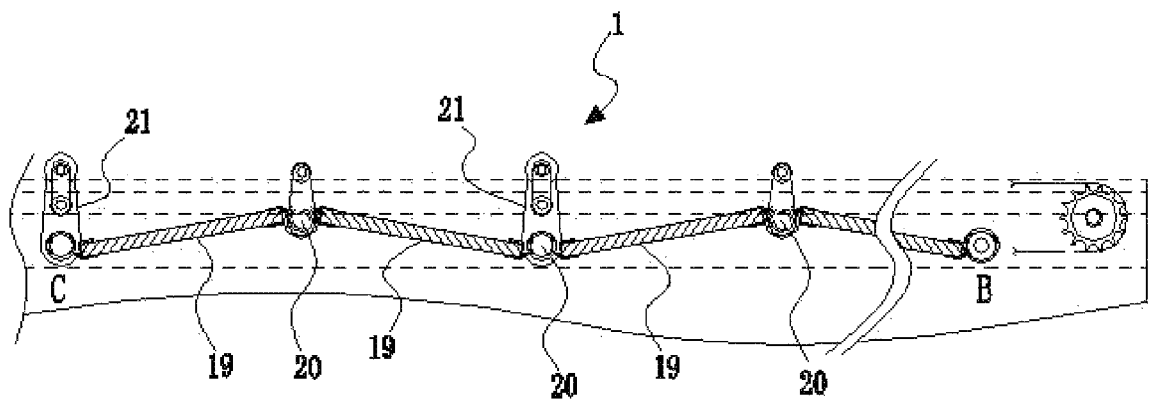
FIG. 5 is a local front structural schematic diagram on a wagon and at a first convertible movable top cover in embodiment 1 of the present invention.
Figure 6:
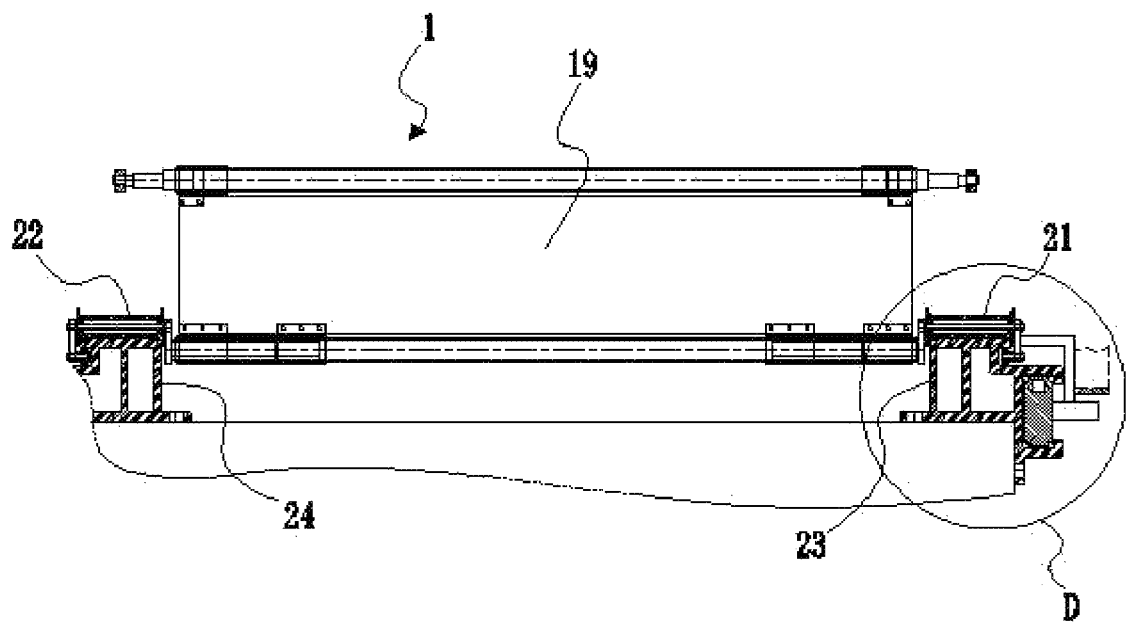
FIG. 6 is a left structural schematic diagram on a wagon and at a first convertible movable top cover in embodiment 1 of the present invention.

As shown in FIG. 5 and FIG. 6, the first convertible movable top cover 1 and the second convertible movable top cover 2 comprise a plurality of plate bodies 19, and the plurality of plate bodies 19 are sequentially connected end to end to form a folding cover plate by a plurality of hinge connecting pieces 20. After the cover plate is folded, first cover plate supporting roller mechanisms 21 and second cover plate supporting roller mechanisms 22 are respectively arranged on both ends of a central shaft of the plurality of hinge connecting pieces 20 located at a lower position and on both sides of one end (C in the figure) of the first plate body 19 in the plurality of plate bodies. One end (B in the figure) of the last plate body of the plurality of plate bodies 19 is fixedly connected to the wagon.

A first track 23 and a second track 24 are arranged on both sides of a top opening of the wagon 3 along the length direction of the wagon 3. The plurality of first cover plate supporting roller mechanisms 21 are in rolling contact with the first track 23, and the plurality of second cover plate supporting roller mechanisms 22 are in rolling contact with the second track 24, so that the first convertible movable top cover 1 and the second convertible movable top cover 2 can be moved along the first track 23 and the second track 24 and opened or closed and furled. The cover plate supporting roller mechanisms are matched with the tracks so as to ensure the smoothness of the folding movable top covers during motion. Herein, the folding movable top covers can also be ordinary folding top covers.

As shown in FIG. 6 to FIG. 9, a first guide rail 25 is arranged on a side portion of the first track 23; the first guide rail 25 and the first track 23 can be configured into an integral structure; a second guide rail 26 is arranged on a side portion of the second track 24; the second guide rail 26 and the second track 24 can also be configured into an integral structure; a first sliding block 27 and a second sliding block 28 are respectively arranged in the first guide rail 25 and the second guide rail 26; and the first sliding block 27 and the second sliding block 28 can respectively move back and forth along the first guide rail 25 and the guide rail 26. The first outer convex portion 6 is arranged on the side portion of the first sliding block 27. The first outer convex portion 6 is connected with the first cover plate supporting roller mechanism 21 on one end of the first plate body 19 of the first convertible movable top cover 1 by a first connecting rod 29; and one side of the first driving belt 511 is also connected to the first connecting rod 29 through the connecting piece (such as connecting sheet). One end of the last plate body 19 of the first convertible movable top cover 1 is fixedly connected to the wagon. The second outer convex portion 7 is arranged on the side portion of the second sliding block 28. The second outer convex portion 7 is connected with the second cover plate supporting roller mechanism 22 on one end of the first plate body 19 of the second convertible movable top cover 2 by a second connecting rod 30; and one side of the second driving belt 512 is also connected to the second connecting rod 30 through the connecting piece (such as a connecting sheet). One end of the last plate body 19 of the second convertible movable top cover 2 is fixedly connected to the wagon. The sliding blocks are matched with the guide rails so as to further ensure the smoothness of the folding movable top covers during motion.

Figure 7:
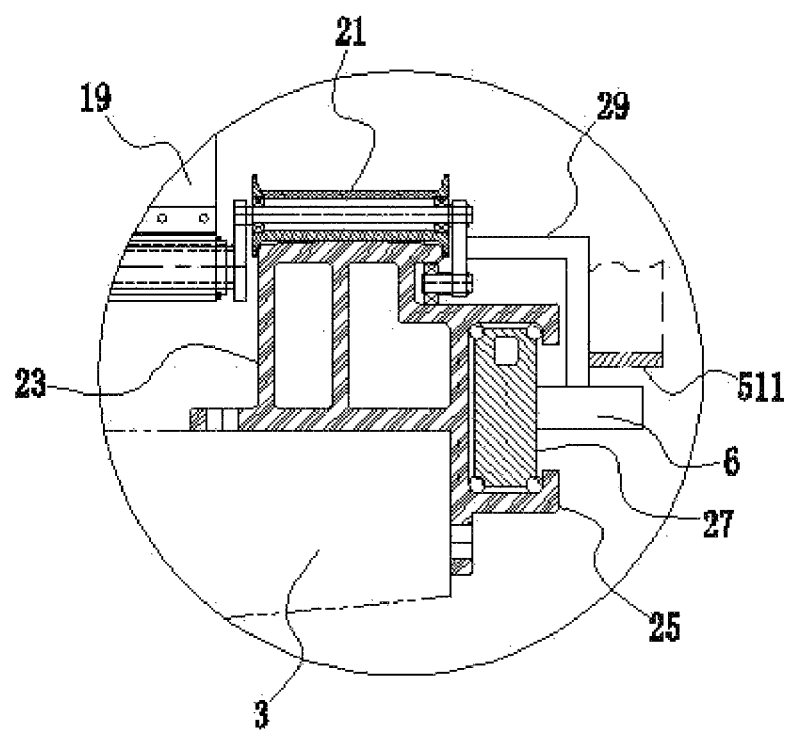
FIG. 7 is an amplified structural schematic diagram of portion D in FIG. 6.
Figure 8:
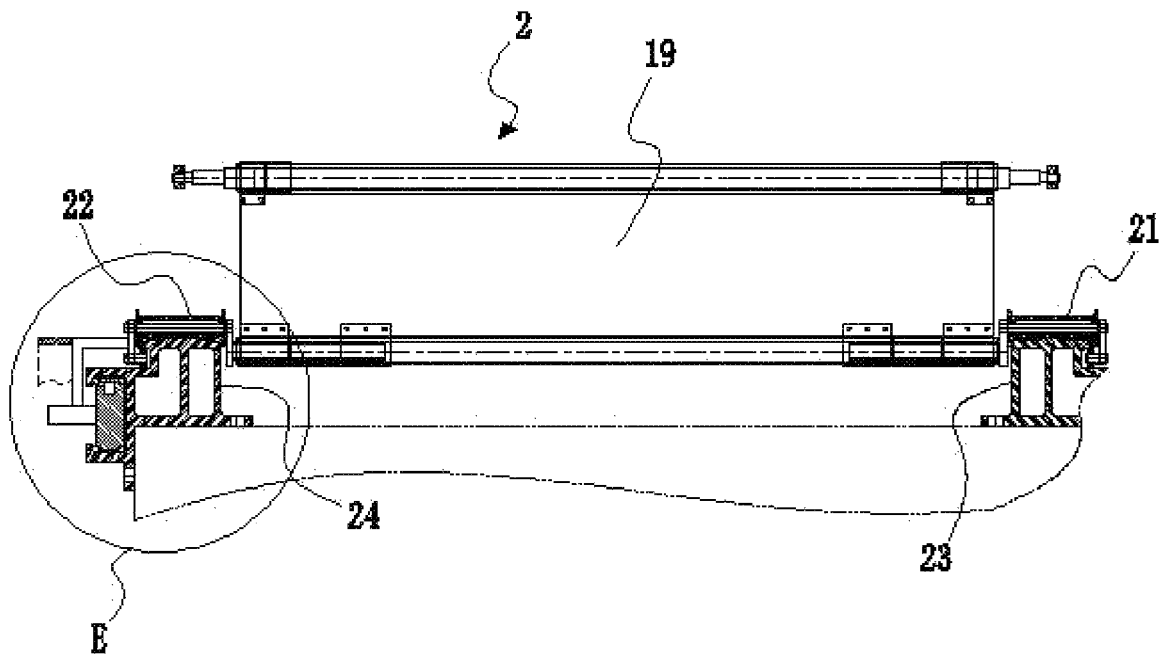
FIG. 8 is a left front structural schematic diagram on a wagon and at a second convertible movable top cover in embodiment 1 of the present invention.
Figure 9:
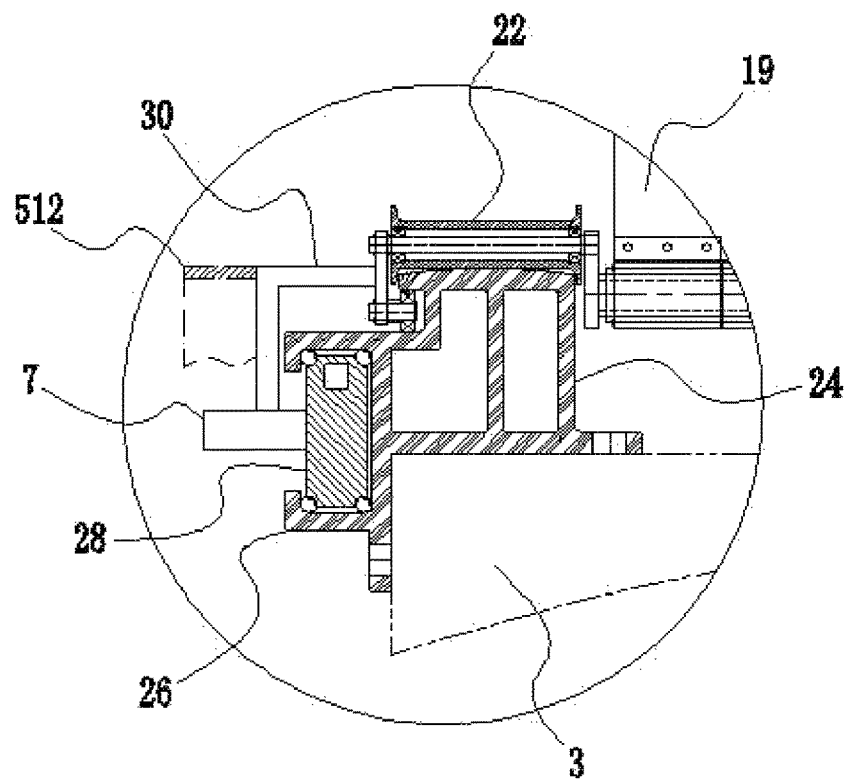
FIG. 9 is an amplified structural schematic diagram of portion E in FIG. 8.
Figure 10:
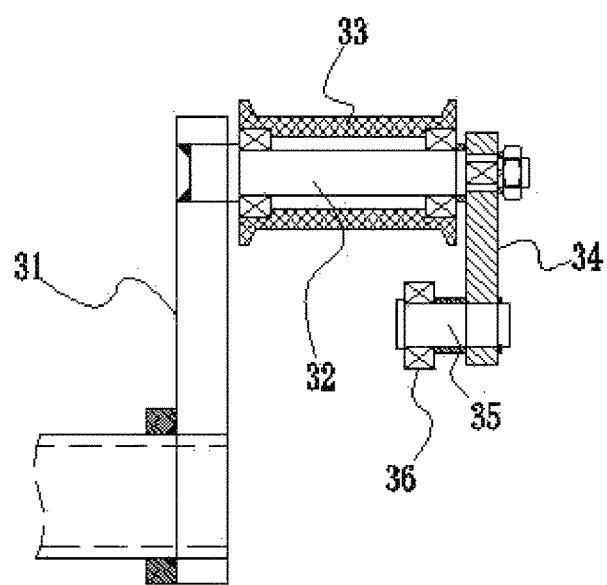
FIG. 10 is a structural schematic diagram of a first cover plate supporting roller mechanism of embodiment 1 of the present invention.

As shown in FIG. 7 and FIG. 10, the first track 23 and the second track 24 comprise track bodies and side guide grooves arranged on one side of the track bodies. The first cover plate supporting roller mechanism 21 and the second cover plate supporting roller mechanism 22 comprise a vertical supporting plate 31, a first horizontal connecting rod 32 arranged on one side of the vertical supporting plate 31, and a supporting roller 33 rotatably sleeved to the first horizontal connecting rod 32 through a first bearing. One end of the first horizontal connecting rod 32 is connected with the vertical supporting plate 31. The other side of the first horizontal connecting rod 32 is connected with a side plate 34. The vertical supporting plate 31, the first horizontal connecting rod 32 and the side plate 34 form an inverted U shape. One end of the side plate 34 is connected with the other end of the first horizontal connecting rod 32. A second horizontal connecting rod 35 is arranged on the other end of the side plate 34, and a guide roller 36 is rotatably connected to the second horizontal connecting rod 35.

The supporting roller 33 and the guide roller 36 of the first cover plate supporting roller mechanism 21 are in rolling contact with the top of the track body and the side guide groove of the first track 23, and the supporting roller 33 and the guide roller 36 of the second cover plate supporting roller mechanism 22 are in rolling contact with the top of the track body and the second side guide groove of the track 24, so that the folding movable cover plates are opened or the folding movable cover plates are furled together. In the present embodiment, the supporting rollers and the tracks are in rolling contact to realize the moving function of the folding cover plate on the track, so as to conveniently open the folding cover plates or furl the folding cover plates together. In addition, the guide roller of the first cover plate supporting roller mechanism and the guide roller of the second cover plate supporting roller mechanism are matched with the first side guide groove of the track and the second side guide groove of the track, so as to ensure the smoothness of the folding top covers when opened and moved or furled and moved and further ensure the successful operation.

Figure 11:
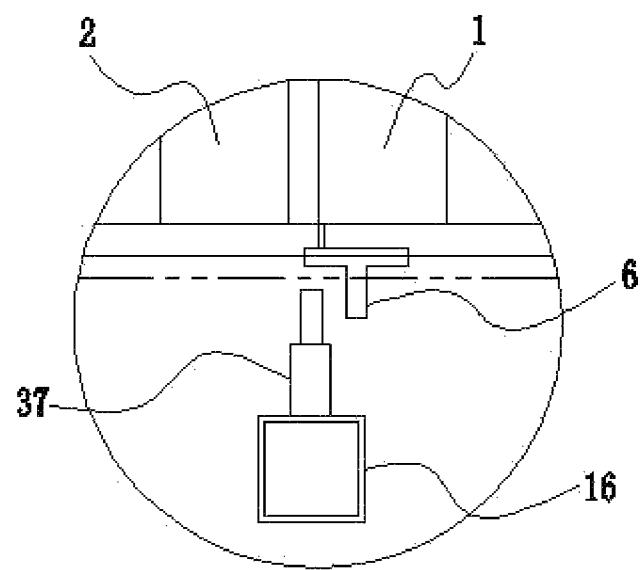
FIG. 11 is a local top structural schematic diagram at one stopper device in an opening and closing mechanism of embodiment 2 of the present invention.

Embodiment 2: as shown in FIG. 11, compared with embodiment 1, the difference is that: the stopper device 18 and the second stopper device 9 comprise ground rods 16 arranged on the ground and telescopic cylinders 37 arranged on the ground rods 16. In the present embodiment, a cylinder or hydraulic cylinder can be adopted as the telescopic cylinder.

When the folding movable top cover is opened, a piston rod of the telescopic cylinder 37 in the stopper device 18 is controlled to extend and then the wagon 3 is controlled to move, and the piston rod of the telescopic cylinder 37 in the stopper device 18 is in contact with the first outer convex portion 6, thereby driving the belt driving mechanism to rotate in one direction to open the first convertible movable top cover 1 and the second convertible movable top cover 2. When the first convertible movable top cover 1 and the second convertible movable top cover 2 are opened in place, the piston rod of the telescopic cylinder 37 in the first stopper device 8 is controlled to retract.

When the folding movable top cover is closed, a piston rod of the telescopic cylinder 37 in the second stopper device 9 is controlled to extend and then the wagon 3 is controlled to continue to move in the same direction, and the piston rod of the telescopic cylinder 37 in the second stopper device 9 is in contact with the second outer convex portion 7, thereby driving the belt driving mechanism to rotate in another opposite direction to close the first convertible movable top cover 1 and the second convertible movable top cover 2. When the first convertible movable top cover 1 and the second convertible movable top cover 2 are closed in place, the piston rod of the telescopic cylinder 37 in the second stopper device 9 is controlled to retract.

Figure 12:
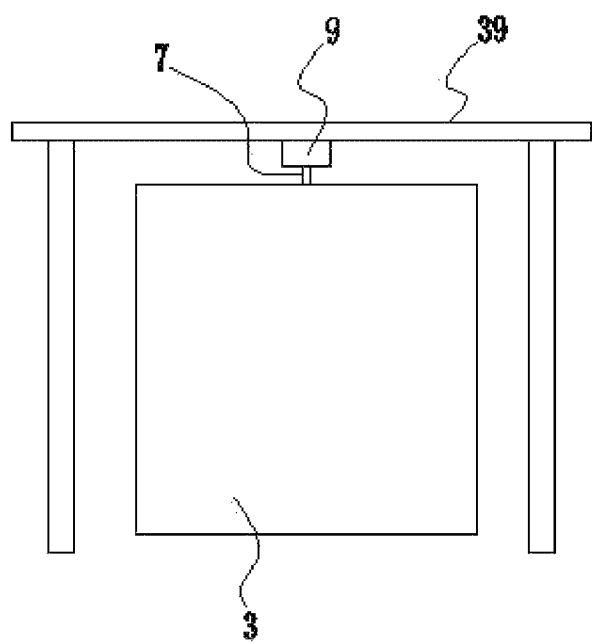
FIG. 12 is a schematic diagram of matching of an outer convex portion and a stopper device in an opening and closing mechanism of embodiment 3 of the present invention.
Figure 13:
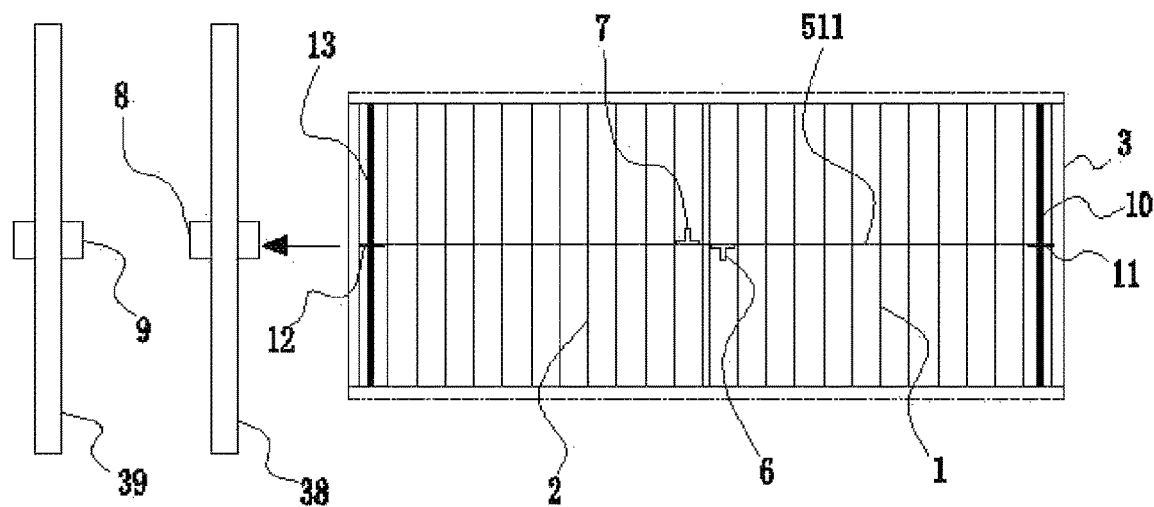
FIG. 13 is a top structural schematic diagram of an opening and closing mechanism in embodiment 3 of the present invention.

Embodiment 3: as shown in FIG. 12 and FIG. 13, the belt driving mechanism also comprises a first rotating wheel 11 rotatably connected to the middle part of the wagon through a first rotating shaft 10, and a second rotating wheel 12 rotatably connected to the middle part of the wagon through a second rotating shaft 13; the first rotating wheel 11 and the second rotating wheel 12 are in matched transmission connection by a first driving belt 511. One end of the first convertible movable top cover 1 is connected with one side of the first driving belt 511; the other end of the first convertible movable top cover 1 is fixedly connected to the wagon 3; one end of the second convertible movable top cover 2 is connected with the other side of the driving belt 511; the moving direction of one side of the driving belt 511 is opposite to the moving direction of the other side of the driving belt 511; the other end of the second convertible movable top cover 2 is also fixedly connected to the wagon 3. The stopper device 18 and the second stopper device 9 are respectively arranged on the ground through a first gantry 38 and a second gantry 39, and the stopper device 18 and the second stopper device 9 are located at the middle positions of the wagon 3; the first outer convex portion 6 and the second outer convex portion 7 are also respectively arranged at the middle position of the end portion of the first convertible movable top cover 1 and at the middle position of the end portion of the second convertible movable top cover 2.

When the folding movable top cover is opened, the wagon 3 is controlled to move so that the stopper device 18 comes into contact with the first outer convex portion 6, thereby driving the belt driving mechanism to rotate in one direction to open the first convertible movable top cover 1 and the second convertible movable top cover 2.

When the folding movable top cover is closed, the wagon 3 is controlled to continue to move in the same direction, and the second stopper device 9 comes into contact with the second outer convex portion 7, thereby driving the belt driving mechanism to rotate in another opposite direction to close the first convertible movable top cover 1 and the second convertible movable top cover 2.

Figure 14:
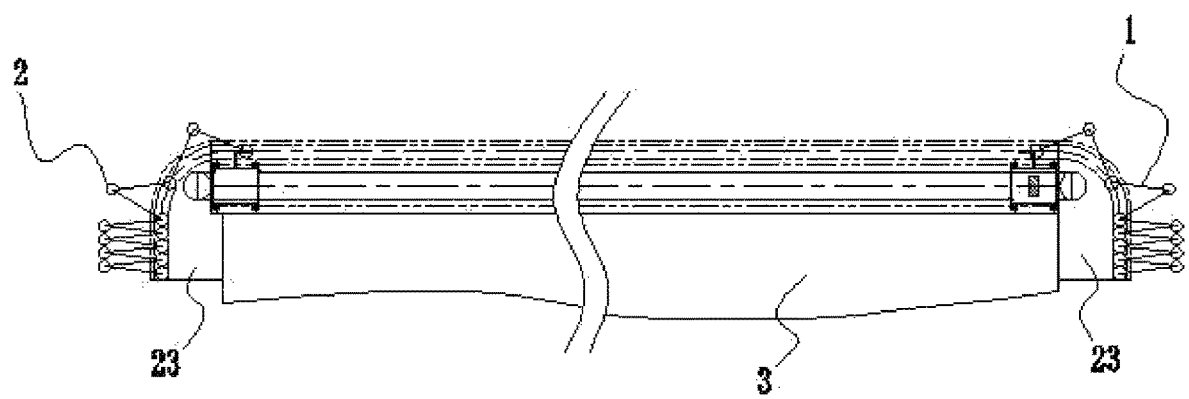
FIG. 14 is a front structural schematic diagram on a wagon and at a first convertible movable top cover and a second convertible movable top cover in embodiment 4 of the present invention.

Embodiment 4: as shown in FIG. 14, the differences from embodiment 1 are that: the first track 23 and the second track 24 are arranged in an inverted U shape; one end of the last plate body 19 of the plurality of plate bodies of the first convertible movable top cover 1 is fixedly connected to one end of the first inverted U-shaped track 23 and second track 24, and one end of the last plate body 19 of the plurality of plate bodies of the second convertible movable top cover 2 is fixedly connected to the other end of the first inverted U-shaped track 23 and second track 24. In this way, the first convertible movable top cover and the second convertible movable top cover can be furled and then respectively furled to both side portions of the wagon (as shown in FIG. 14), thereby reducing the space occupied by the top of the wagon.

Figure 15:
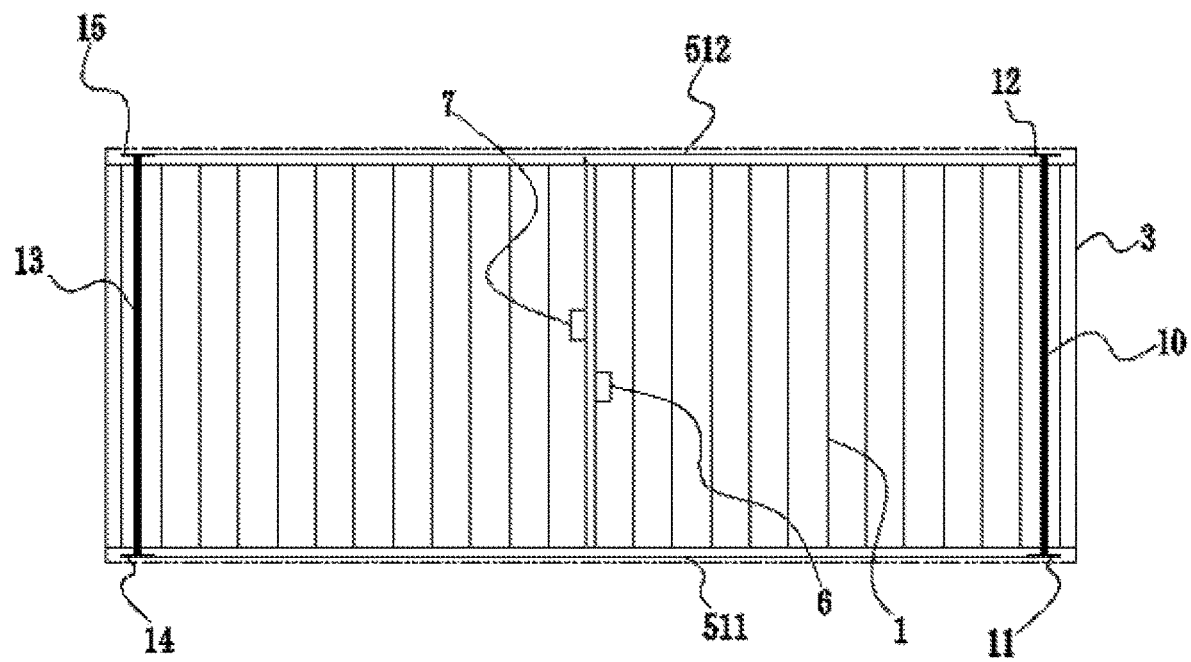
FIG. 15 is a top structural schematic diagram of an opening and closing mechanism when a folding movable top cover is closed in embodiment 5 of the present invention.

Embodiment 5: as shown in FIG. 15, compared with embodiment 1, the differences are that: the belt driving mechanism also comprises a first rotating wheel 11 and a second rotating wheel 12 which are rotatably connected to both sides of the wagon 3 through a first rotating shaft 10, and a third rotating wheel 14 and a fourth rotating wheel 15 which are rotatably connected to both sides of the wagon 3 through a second rotating shaft 13; the driving belt comprises a first driving belt 511 and a second driving belt 512; the first rotating wheel 11 and the third rotating wheel 14 are in matched transmission connection by the first driving belt 511; the second rotating wheel 12 and the fourth rotating wheel 15 are in matched transmission connection by the second driving belt 512; one end of the first convertible movable top cover 1 is connected with one side of the first driving belt 11; the first outer convex portion 6 is arranged on one end of the first convertible movable top cover 1 located in the middle part of the wagon; the other end of the first convertible movable top cover 1 is fixedly connected to the wagon 3; one end of the second convertible movable top cover 2 is connected with one side of the second driving belt 512; the second outer convex portion 7 is arranged on one end of the second convertible movable top cover 2 located in the middle part of the wagon; the moving direction of one side of the first driving belt 511 is opposite to the moving direction of one side of the second driving belt 512; the other end of the second convertible movable top cover 2 is also fixedly connected to the wagon 3; the first stopper device and the second stopper device are respectively arranged on the ground on both sides of the wagon; during the motion of the wagon, the first stopper device can come into contact with the first outer convex portion located in the middle part of the wagon, and the second stopper device can come into contact with the second outer convex portion at the middle part of the wagon (not shown in the figure).

Figure 16:
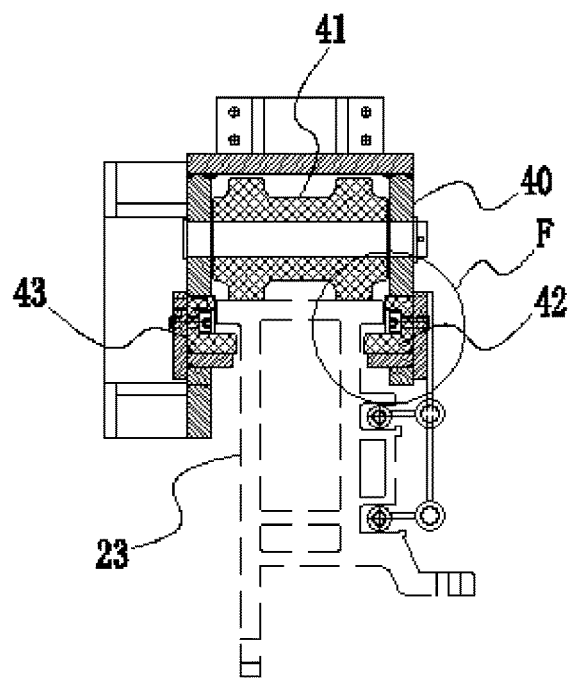
FIG. 16 is a structural schematic diagram of matching of a first cover plate supporting roller mechanism and a first track in embodiment 6 of the present invention.
Figure 17:
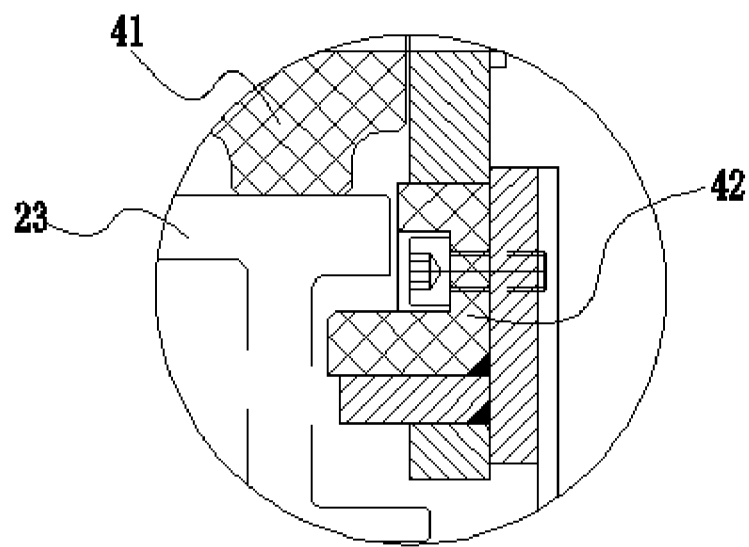
FIG. 17 is an amplified structural schematic diagram of portion F in FIG. 16.

Embodiment 6: as shown in FIG. 16 and FIG. 17, compared with embodiment 1, the differences are that: the first cover plate supporting roller mechanism 21 comprises a mechanism bracket 40, a top supporting wheel 41 rotatably connected to the mechanism bracket 40, a first anti-drop guide block 42 arranged on one side portion of the mechanism bracket 40, and a second anti-drop guide block 43 arranged on the other side portion of the mechanism bracket 40. The first anti-drop guide block 42 and the second anti-drop guide block 43 are in L shape. The structure of the second cover plate supporting roller mechanism is the same as the structure of the first cover plate supporting roller mechanism.

The first track 23 and the second track 24 are in I shape. The top supporting wheel 41 of the first cover plate supporting roller mechanism 21 is in rolling contact on the top of the first I-shaped track 23, and the top supporting wheel of the second cover plate supporting roller mechanism is in rolling contact on the top of the second I-shaped track. The first L-shaped anti-drop guide block 42 and the second L-shaped anti-drop guide block 43 in the first cover plate supporting roller mechanism 21 are respectively located in positions of both sides of the top of the first I-shaped track 23, and the first L-shaped anti-drop guide block and the second L-shaped anti-drop guide block in the second cover plate supporting roller mechanism are respectively located in positions of both sides of the top of the second I-shaped track.

During motion of the folding movable top cover, the first L-shaped anti-drop guide block and the second L-shaped anti-drop guide block in the first cover plate supporting roller mechanism are matched with the first I-shaped track, and the first L-shaped anti-drop guide block and the second L-shaped anti-drop guide block in the second cover plate supporting roller mechanism are matched with the second I-shaped track, to prevent a dropping phenomenon between the cover plate supporting roller mechanism and the track and ensure the guidance performance of the cover plate supporting roller mechanism during motion along the track. For example, when the cover plate supporting roller mechanism has a tendency to derail, the first L-shaped anti-drop guide block and the second L-shaped anti-drop guide block will hook the I-shaped track, thereby avoiding the occurrence of the derailment phenomenon; and when the cover plate supporting roller mechanism is offset to the left and right directions along the track, the first L-shaped anti-drop guide block and the second L-shaped anti-drop guide block are respectively in contact with the two side surfaces of the top of the I-shaped track, thereby ensuring the guidance performance, so that the cover plate supporting roller mechanism can always move along the track. In the present embodiment, the first L-shaped anti-drop guide block and the second L-shaped anti-drop guide block are made of nylon, graphite or copper blocks.

Figure 18:
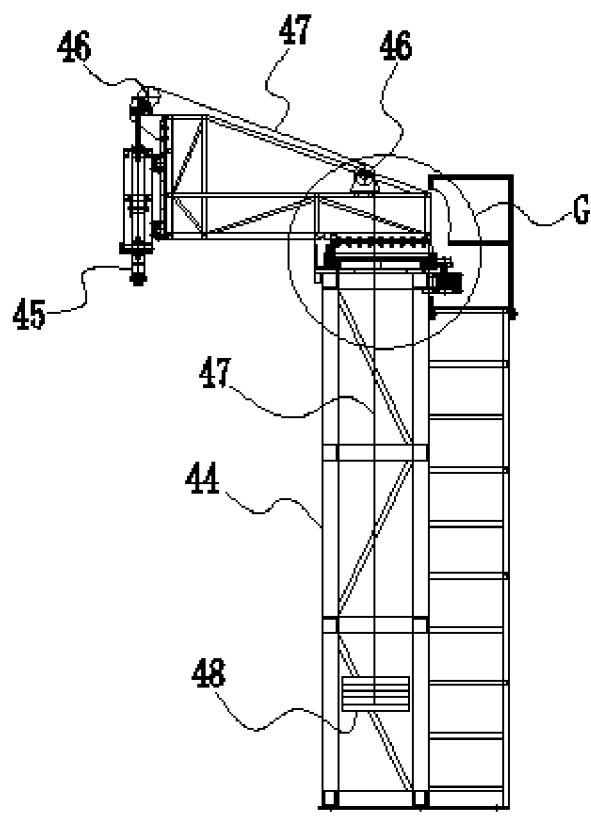
FIG. 18 is a front structural schematic diagram of a first stopper device in embodiment 7 of the present invention.
Figure 19:
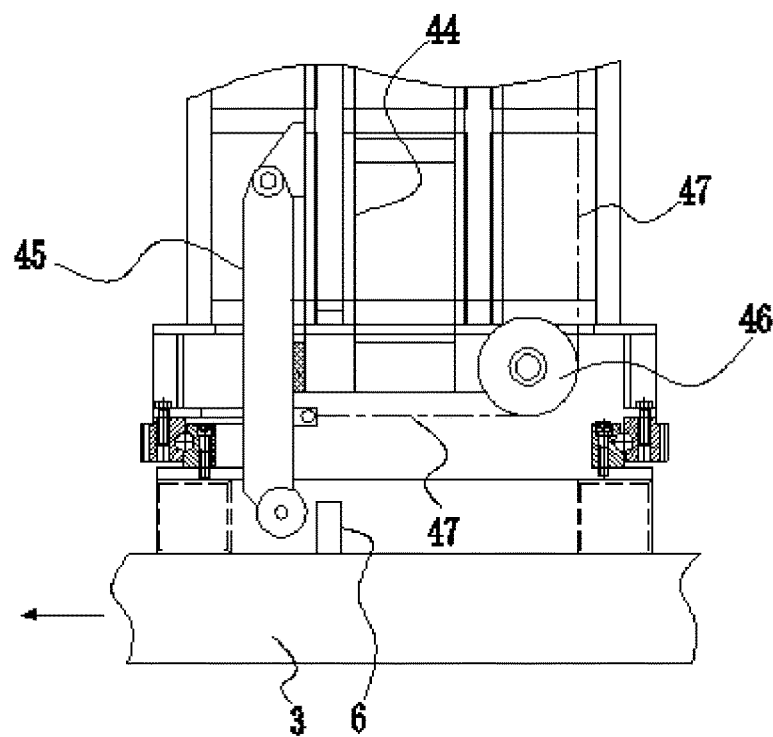
FIG. 19 is a first structural schematic diagram of matching of a first outer convex portion and a blocking arm when a folding movable top cover is opened in embodiment 7 of the present invention.

Embodiment 7: as shown in FIG. 18 and FIG. 19, compared with embodiment 1, the differences are that: the stopper device 18 comprises a device bracket 44, a blocking arm hinged on the device bracket 44 at one end, and a fixed pulley block arranged on the device bracket 44. The fixed pulley block comprises a plurality of fixed pulleys 46 arranged on the device bracket 44 and a pull rope 47 matched with the plurality of fixed pulleys 46. One end of the pull rope 47 is connected with the other end of the blocking arm 45, and a weight block 48 is fixedly connected with the other end of the pull rope 47. The structure of the second stopper device is the same as the structure of the first stopper device.

Figure 20:
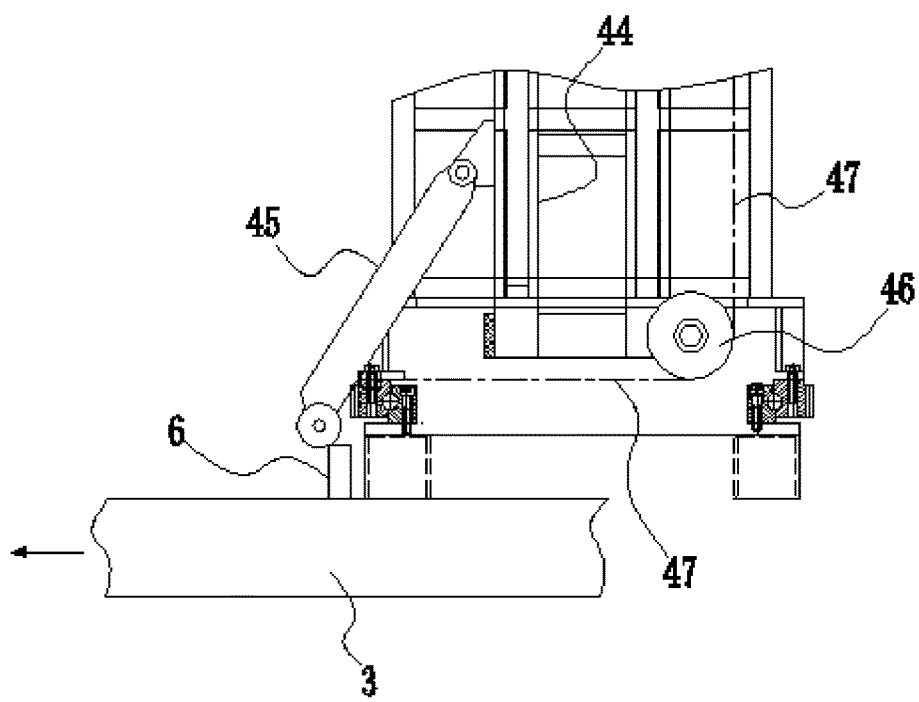
FIG. 20 is a second structural schematic diagram of matching of a first outer convex portion and a blocking arm when a folding movable top cover is opened in embodiment 7 of the present invention.

As shown in FIG. 19 and FIG. 20, when the folding movable top cover is opened, the wagon 3 is controlled to move so that the other end of the blocking arm 45 of the first stopper device comes into contact with the first outer convex portion 6, thereby driving the belt driving mechanism to rotate in one direction to open the first convertible movable top cover and the second convertible movable top cover. In this process, because the blocking arm is tensioned by the weight block through the pull rope, the folding movable top cover is folded under the blocking of the blocking arm, while the blocking arm is stationary in the folding process of the folding movable top cover. After the folding movable top cover is completely folded, because the folding movable top cover cannot be folded and moved, a first outer convex block 6 reacts on the blocking arm 45 under the continuous motion of the wagon 3. When the reacting force is larger than the gravity of the weight block, under the reacting force of the first outer convex block 6 on the folding movable top cover, the other end of the blocking arm 45 rotates about a hinged point at one end. Under the continuous motion of the wagon 3, the first outer convex block 6 is gradually separated from the other end of the blocking arm 45. After separated, under the gravity action of the weight block, the other end of the blocking arm 45 rotates reversely about the hinged point at one end so that the blocking arm 45 returns to the original position.

When the folding movable top cover is closed, the wagon is controlled to continue to move so that the other end of the blocking arm of the second stopper device comes into contact with the second outer convex portion, thereby driving the belt driving mechanism to rotate in another direction to close the first convertible movable top cover and the second convertible movable top cover. In this process, because the blocking arm is tensioned by the weight block through the pull rope, the folding movable top cover is opened under the blocking of the blocking arm, while the blocking arm is stationary in the opening process of the folding movable top cover. After the folding movable top cover is completely opened, because the folding movable top cover cannot be opened and moved, a first outer convex block reacts on the blocking arm under the continuous motion of the wagon. When the reacting force is larger than the gravity of the weight block, under the reacting force of the second outer convex block on the folding movable top cover, the other end of the blocking arm rotates about a hinged point at one end. Under the continuous motion of the wagon, the second outer convex block is gradually separated from the other end of the blocking arm. After separated, under the gravity action of the weight block, the other end of the blocking arm rotates reversely about the hinged point at one end so that the blocking arm returns to the original position (not shown in the figure).

Figure 21:
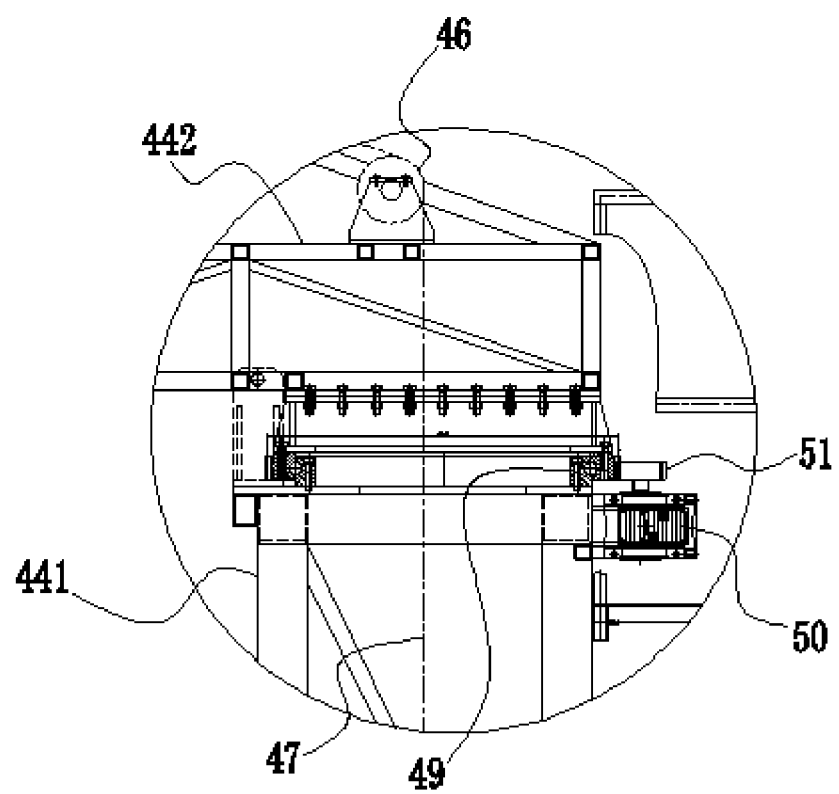
FIG. 21 is an amplified structural schematic diagram of portion G in FIG. 18.

As shown in FIG. 21, the device bracket 44 comprises a bracket base 441 and a rotating bracket 442 rotatably connected to the bracket base 441 through a slewing bearing 49. The blocking arm 45 and a fixed pulley block are arranged on the rotating bracket 442. The outer ring of the slewing bearing 49 is an outer tooth ring. A motor 50 is also arranged on the bracket base 441. An output shaft of the motor 50 is provided with a driving gear 51. The driving gear 51 is matched with the outer tooth ring of the slewing bearing 49, so as to drive the rotating bracket 442 to rotate. Because the blocking arm is in a spatial position above the rail during work, when a special condition occurs, the rotating bracket can be driven by the motor to rotate so that the blocking arm can leave the spatial position above the rail.

To sum up, the present invention uses the characteristic that the moving directions of both sides of the driving belt bypassing the driving wheel in the belt drive mechanism are opposite, and enables the stopper devices arranged on the ground to be matched with the outer convex portions on the end portions of the folding movable end cover with the two-half structure, so that the first convertible movable top cover and the second convertible movable top cover can be automatically opened or closed together without adding a power mechanism or manual operation, thereby reducing the installation difficulty of the movable top cover and reducing the installation cost of the movable top cover. Through different structural design of the first stopper device and the second stopper device arranged on the ground, it is more convenient to control the opening and closing of the folding movable top cover on the wagon. Through the matching of the guide rails and the sliding blocks, the smoothness of the folding movable top cover during motion can be further ensured. The first track and the second track are arranged in an inverted U shape. In this way, the first convertible movable top cover and the second convertible movable top cover can be furled and then respectively furled to both side portions of the wagon, thereby reducing the space occupied by the top of the wagon.

"A plurality of" in the above embodiments means a quantity of "two or more than two". The above embodiments are merely used for illustration of the present invention, and are not intended to limit the present invention. Various changes or transformations can also be made by those skilled in the art without departing from the spirit and the scope of the present invention. Therefore, all equivalent technical solutions shall also belong to the protection scope of the present invention, and the protection scope of the present invention shall be defined by the claims.

What is claimed is:

1. An opening and closing method of a convertible movable top cover of a railway freight wagon, the opening and closing method comprising configuring the convertible movable top cover as a two-half structure comprising a first convertible movable top cover and a second convertible movable top cover; wherein the first convertible movable top cover and the second convertible movable top cover can be respectively furled and opened from a middle part of the wagon to both ends of the wagon; a belt driving mechanism is also arranged on the wagon; one end of the first convertible movable top cover is connected with one side of a driving belt in the belt driving mechanism, and a first outer convex portion is arranged at the end of the first convertible movable top cover; the other end of the first convertible movable top cover is fixed on the wagon; one end of the second convertible movable top cover is connected with the other side of the driving belt in the belt driving mechanism, and a second outer convex portion is arranged at the end of the second convertible movable top cover; the other end of the second convertible movable top cover is fixed on the wagon; a moving direction of the side of the driving belt is opposite to a moving direction of the other side of the driving belt; and a first stopper device and a second stopper device are arranged on a ground; when the wagon moves, the first stopper device comes into contact with the first outer convex portion to drive the belt driving mechanism to rotate in one direction, so that the first convertible movable top cover and the second convertible movable top cover are respectively furled and opened from the middle part of the wagon to the both ends of the wagon; when the wagon continues to move in the same direction, the second stopper device comes into contact with the second outer convex portion to drive the belt driving mechanism to rotate in another opposite direction, so that the first convertible movable top cover and the second convertible movable top cover are extended and closed from the both ends of the wagon to the middle part of the wagon.

2. The opening and closing method of the convertible movable top cover of the railway freight wagon according to claim 1, wherein the belt driving mechanism comprises a first rotating wheel and a second rotating wheel which are rotatably connected to both sides of the wagon through a first rotating shaft, and a third rotating wheel and a fourth rotating wheel which are rotatably connected to the both sides of the wagon through a second rotating shaft; the driving belt comprises a first driving belt and a second driving belt; the first rotating wheel and the third rotating wheel are in matched transmission connection by the first driving belt; the second rotating wheel and the fourth rotating wheel are in matched transmission connection by the second driving belt; one end of the first convertible movable top cover is connected with one side of the first driving belt; the first outer convex portion is arranged on the end of the first convertible movable top cover adjacent to the first driving belt; the other end of the first convertible movable top cover is fixedly connected to the wagon; the end of the second convertible movable top cover is connected with one side of the second driving belt; the second outer convex portion is arranged on the end of the second convertible movable top cover adjacent to the second driving belt; a moving direction of the side of the first driving belt is opposite to a moving direction of the side of the second driving belt; the other end of the second convertible movable top cover is also fixedly connected to the wagon; the first stopper device and the second stopper device are respectively arranged on the ground on the both sides of the wagon.

3. The opening and closing method of the convertible movable top cover of the railway freight wagon according to claim 2, wherein both the first stopper device and the second stopper device comprise a ground rod arranged on the ground and a stopper having an end hinged on the ground rod; and a reset tension spring is further arranged between the stopper and the ground rod;

when the convertible movable top cover is to be opened, controlling the wagon to move and the other end of the stopper in the first stopper device is in contact with the first outer convex portion, thereby driving the belt driving mechanism to rotate in one direction to open the first convertible movable top cover and the second convertible movable top cover; meanwhile, the reset tension spring of the first stopper device is stretched; when the first convertible movable top cover and the second convertible movable top cover are opened in place, controlling the wagon to continue to move, at this moment, under the driving of the wagon, the first outer convex portion is separated from the other end of the stopper in the first stopper device; and under a reset action of the reset tension spring of the first stopper device, the stopper of the first stopper device returns to an original position;

when the convertible movable top cover is to be closed, controlling the wagon to continue to move in the same direction and the other end of the stopper in the second stopper device is in contact with the second outer convex portion, thereby driving the belt driving mechanism to rotate in another opposite direction to close the first convertible movable top cover and the second convertible movable top cover; meanwhile, the reset tension spring of the second stopper device is stretched; when the first convertible movable top cover and the second convertible movable top cover are closed in place, controlling the wagon to continue to move; at this moment, under the driving of the wagon, the second outer convex portion is separated from the other end of the stopper in the second stopper device; and under the reset action of the reset tension spring of the second stopper device, the stopper of the second stopper device returns to an original position.

4. The opening and closing method of the convertible movable top cover of the railway freight wagon according to claim 2, wherein both the first stopper device and the second stopper device comprise a ground rod arranged on the ground and a telescopic cylinder arranged on the ground rod;

when the convertible movable top cover is to be opened, controlling a piston rod of the telescopic cylinder in the first stopper device to extend and then controlling the wagon to move, and the piston rod of the telescopic cylinder in the first stopper device is in contact with the first outer convex portion, thereby driving the belt driving mechanism to rotate in one direction to open the first convertible movable top cover and the second convertible movable top cover; when the first convertible movable top cover and the second folding movable top cover are opened in place, controlling the piston rod of the telescopic cylinder in first the stopper device to retract;

when the convertible movable top cover is to be closed, controlling a piston rod of the telescopic cylinder in the second stopper device to extend and then controlling the wagon to continue to move in the same direction, and the piston rod of the telescopic cylinder in the second stopper device is in contact with the second outer convex portion, thereby driving the belt driving mechanism to rotate in another opposite direction to close the first convertible movable top cover and the second convertible movable top cover; when the first convertible movable top cover and the second convertible movable top cover are closed in place, controlling the piston rod of the telescopic cylinder in the second stopper device to retract.

5. The opening and closing method of the convertible movable top cover of the railway freight wagon according to claim 1, wherein the belt driving mechanism further comprises a first rotating wheel rotatably connected to the middle part of the wagon through a first rotating shaft, and a second rotating wheel rotatably connected to the middle part of the wagon through a second rotating shaft; the first rotating wheel and the second rotating wheel are in matched transmission connection by the first driving belt; the second rotating wheel and the fourth rotating wheel are in matched transmission connection by the first driving belt; the end of the first convertible movable top cover is connected with one side of the driving belt; the other end of the first convertible movable top cover is fixedly connected to the wagon; the end of the second convertible movable top cover is connected with the other side of the driving belt; the moving direction of the side of the driving belt is opposite to a moving direction of the other side of the driving belt; the other end of the second convertible movable top cover is also fixedly connected to the wagon; the first stopper device and the second stopper device are respectively arranged on the ground through a first gantry and a second gantry, and the first stopper device and the second stopper device are located at the middle part of the wagon; the first outer convex portion and the second outer convex portion are also respectively arranged at a middle position of an end portion of the first convertible movable top cover and at a middle position of an end portion of the second convertible movable top cover;

when the convertible movable top cover is to be opened, controlling the wagon to move so that the first stopper device comes into contact with the first outer convex portion, thereby driving the belt driving mechanism to rotate in one direction to open the first convertible movable top cover and the second convertible movable top cover;

when the convertible movable top cover is to be closed, controlling the wagon to continue to move in the same direction, and the second stopper device comes into contact with the second outer convex portion, thereby driving the belt driving mechanism to rotate in another opposite direction to close the first convertible movable top cover and the second convertible movable top cover.

6. The opening and closing method of the convertible movable top cover of the railway freight wagon according to claim 1, wherein the belt driving mechanism further comprises a first rotating wheel and a second rotating wheel which are rotatably connected to the both sides of the wagon through a first rotating shaft, and a third rotating wheel and a fourth rotating wheel which are rotatably connected to the both sides of the wagon through a second rotating shaft; the driving belt comprises a first driving belt and a second driving belt; the first rotating wheel and the third rotating wheel are in matched transmission connection by the first driving belt; the second rotating wheel and the fourth rotating wheel are in matched transmission connection by the second driving belt; the end of the first convertible movable top cover is connected with one side of the driving belt; the first outer convex portion is arranged on one end of the first convertible movable top cover located in the middle part of the wagon; the other end of the first convertible movable top cover is fixedly connected to the wagon; the end of the second convertible movable top cover is connected with one side of the second driving belt; the second outer convex portion is arranged on the end of the second convertible movable top cover located in the middle part of the wagon; a moving direction of one side of the first driving belt is opposite to a moving direction of the side of the second driving belt; the other end of the second convertible movable top cover is also fixedly connected to the wagon; the first stopper device and the second stopper device are respectively arranged on the ground on the both sides of the wagon; during a motion of the wagon, the first stopper device can come into contact with the first outer convex portion located in the middle part of the wagon, and the second stopper device can come into contact with the second outer convex portion at the middle part of the wagon.

7. An opening and closing mechanism of a convertible movable top cover of a railway freight wagon wherein the convertible movable top cover is arranged on the wagon, and the convertible movable top cover comprises a first convertible movable top cover and a second convertible movable top cover; and the first convertible movable top cover and the convertible movable top cover can be respectively furled and opened from a middle part of the wagon to both ends of the wagon;

the opening and closing mechanism comprising a belt driving mechanism, wherein the belt driving mechanism comprises a first rotating wheel and a second rotating wheel which are rotatably connected to both sides of the wagon through a first rotating shaft, a third rotating wheel and a fourth rotating wheel which are rotatably connected to the both sides of the wagon through a second rotating shaft, and a driving belt; the driving belt comprises a first driving belt and a second driving belt; the first rotating wheel and the third rotating wheel are in matched transmission connection by the first driving belt; the second rotating wheel and the fourth rotating wheel are in matched transmission connection by the second driving belt; one end of the first convertible movable top cover is connected with one side of a first driving belt; the first outer convex portion is arranged on the end of the first convertible movable top cover; the other end of the first convertible movable top cover is fixedly connected to the wagon; one end of the second convertible movable top cover is connected with one side of the second driving belt; a second outer convex portion is arranged on the end of the second convertible movable top cover; a moving direction of the side of the first driving belt is opposite to a moving direction of the side of the second driving belt; the other end of the second convertible movable top cover is also fixedly connected to the wagon; and a first stopper device and a second stopper device are respectively arranged on a ground on the both sides of the wagon; when the wagon moves, the first stopper device comes into contact with the first outer convex portion to drive the belt driving mechanism to rotate in one direction, so that the first convertible movable first top cover and the second convertible movable top cover are respectively furled and opened from the middle part of the wagon to the both ends of the wagon; when the wagon continues to move in the same direction, the second stopper device comes into contact with the second outer convex portion to drive the belt driving mechanism to rotate in another opposite direction, so that the first convertible movable top cover and the second convertible movable top cover are extended and closed from the both ends of the wagon to the middle part of the wagon.

8. The opening and closing mechanism of the convertible movable top cover of the railway freight wagon according to claim 7, wherein both the first convertible movable top cover and the second convertible movable top cover comprise a plurality of plate bodies, and the plurality of plate bodies are sequentially connected end to end to form a foldable cover plate by a plurality of hinge connecting pieces; after the cover plate is folded, first cover plate supporting roller mechanisms and second cover plate supporting roller mechanisms are respectively arranged on both ends of a central shaft of the plurality of hinge connecting pieces located at a lower position and on both sides of one end of a first one plate body in the plurality of plate bodies;

a first track and a second track are arranged on both sides of a top opening of the wagon; the plurality of first cover plate supporting roller mechanisms are in rolling contact with the first track, and the plurality of second cover plate supporting roller mechanisms are in rolling contact with the second track, so that the first convertible movable top cover and the second convertible movable top cover can be moved along the first track I and the second track and opened or closed and furled.

9. The opening and closing mechanism of the convertible movable top cover of the railway freight wagon according to claim 8, wherein both the first stopper device and the second stopper device comprise a ground rod arranged on the ground and a stopper having an end hinged on the ground rod; and a reset tension spring is further arranged between the stopper and the ground rod; when the wagon moves, the other end of the stopper in the first stopper device is in contact with the first outer convex portion, thereby driving the belt driving mechanism to rotate in one direction to open the first convertible movable top cover and the second convertible movable top cover; when the wagon continues to move, the other end of the stopper in the second stopper device is in contact with the second outer convex portion, thereby driving the belt driving mechanism to rotate in another opposite direction to close the first convertible movable top cover and the second convertible movable top cover.

10. The opening and closing mechanism of the folding movable top cover of the railway freight wagon according to claim 9, wherein a first guide rail is arranged on a side portion of the first track; a second guide rail is arranged on a side portion of the second track; a first sliding block and a second sliding block are respectively arranged in the first guide rail and the second guide rail; and the first sliding block and the second sliding block can respectively move back and forth along the first guide rail and the second guide rail; a side portion of the first sliding block is connected with the first cover plate supporting roller mechanism on one end of the first plate body of the first convertible movable top cover by a first connecting rod; and one side of the first driving belt is also connected to the first connecting rod; one end of the last plate body of the first convertible movable top cover is fixedly connected to the wagon; the second outer convex portion is arranged on a side portion of the second sliding block; the second outer convex portion is connected with the second cover plate supporting roller mechanism on one end of the first plate body of the second convertible movable top cover by a second connecting rod; and the side of the second driving belt is also connected to the second connecting rod through the connecting piece; one end of the last one of the plate bodies of the second convertible movable top cover is fixedly connected to the wagon.

11. The opening and closing mechanism of the convertible movable top cover of the railway freight wagon according to claim 8, wherein both the first stopper device and the second stopper device comprise a ground rod arranged on the ground and a telescopic cylinder arranged on the ground rod; when the wagon moves, a piston rod of the telescopic cylinder in the first stopper device is controlled to extend to come into contact with the first outer convex portion, thereby driving the belt driving mechanism to rotate in one direction to open the first convertible movable top cover and the second convertible movable top cover; when the wagon continues to move, the telescopic cylinder in the second stopper device extends to come into contact with the second outer convex portion, thereby driving the belt driving mechanism to rotate in another opposite direction to close the first convertible movable top cover and the second convertible movable top cover.

12. The opening and closing mechanism of the folding movable top cover of the railway freight wagon according to claim 8, wherein both the first cover plate supporting roller mechanism and the second cover plate supporting roller mechanism comprise a mechanism bracket, a top supporting wheel rotatably connected to the mechanism bracket, first anti-drop guide blocks arranged on one side portion of the mechanism bracket, and second anti-drop guide blocks arranged on the other side portion of the mechanism bracket; and the first anti-drop guide blocks and the second anti-drop guide blocks are in L shape;

the first track and the second track are in I shape; the top supporting wheel of the first cover plate supporting roller mechanism is in rolling contact on a top of the first I-shaped track, and the top supporting wheel of the second cover plate supporting roller mechanism is in rolling contact on a top of the second I-shaped track; the first L-shaped anti-drop guide block and the second L-shaped anti-drop guide block in the first cover plate supporting roller mechanism are respectively located in positions of both sides of the top of the first I-shaped track, and the first L-shaped anti-drop guide block and the second L-shaped anti-drop guide block in the second cover plate supporting roller mechanism are respectively located in positions of both sides of the top of the second I-shaped track.

13. The opening and closing mechanism of the convertible movable top cover of the railway freight wagon according to claim 8, wherein both the first stopper device and the second stopper device comprise a device bracket, a blocking arm having an end hinged on the device bracket, and a fixed pulley block arranged on the device bracket; the fixed pulley block comprises a plurality of fixed pulleys arranged on the device bracket and a plurality of pull ropes matched with the plurality of fixed pulleys; one end of the pull ropes is connected with the other end of the blocking arm, and weight blocks are fixedly connected with the other end of the pull ropes.

\* \* \* \* \*